April 21, 1931. A. C. MATHIESON 1,801,818
VEHICLE BRAKE
Filed Aug. 21, 1926
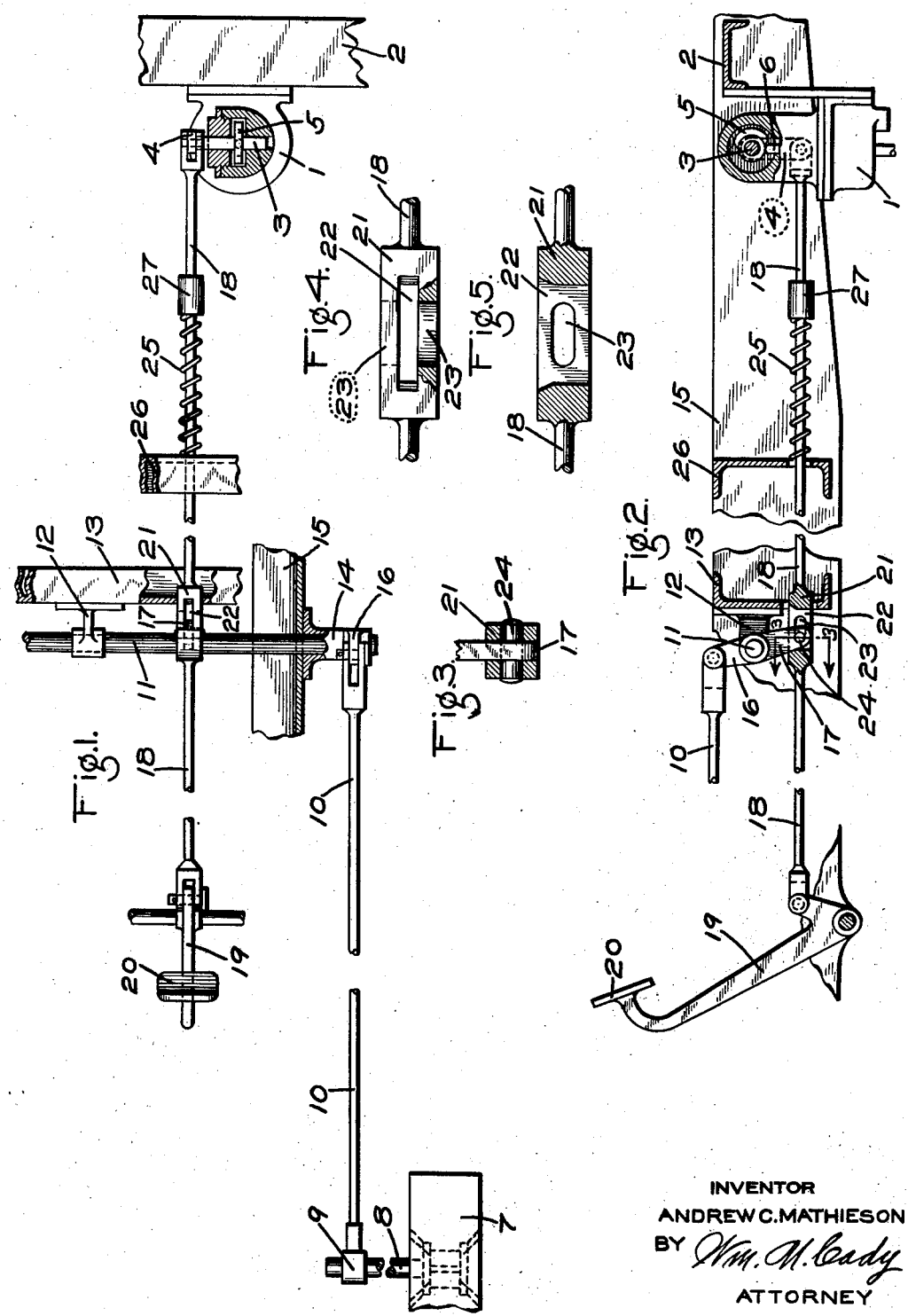
INVENTOR
ANDREW C. MATHIESON
BY Wm. M. Cady
ATTORNEY Patented Apr. 21, 1931

1,801,818

UNITED STATES PATENT OFFICE

ANDREW C. MATHIESON, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VEHICLE BRAKE

Application filed August 21, 1926. Serial No. 130,711.

This invention relates to automotive brakes, and has for its principal object to provide improved means for controlling the brakes on all four wheels of the vehicle.

In the accompanying drawing; Fig. 1 is a fragmentary plan view, partly in section, of a motor vehicle brake equipment embodying my invention; Fig. 2 a side elevation, partly in section, of the equipment shown in Fig. 1; Fig. 3 a section on the line 3—3 of Fig. 2; Fig. 4 a plan view of the lost motion portion of the brake operating pull rod; and Fig. 5 a vertical section of the portion shown in Fig. 4.

According to my invention, a brake valve device 1 is secured to a rear cross member 2 of the motor vehicle and is of the type having an operating shaft 3 to which is secured an operating arm 4. Said shaft is provided with a cam portion 5, adapted to operate a stem 6, the brake valve device being such that when the stem 6 is depressed by the cam 5, fluid under pressure will be supplied to apply the brakes at the rear wheels of the vehicle.

Brakes are also provided for each front wheel of the vehicle, one of which is indicated by the reference numeral 7. Each front wheel brake is provided with a rotatable shaft 8 for operating the usual cam (not shown) by which the brakes are applied, and each shaft is provided with an operating arm 9, which is operatively connected to a pull rod 10.

A transversely disposed shaft 11 is mounted in a bearing bracket 12, secured to a cross member 13 of the vehicle and the opposite ends of the shaft are supported by bearing brackets 14, secured to each of the side members 15 of the vehicle. Each pull rod 10 is pivotally connected to an arm 16, secured to the shaft 11 and also secured to said shaft is an arm 17.

A pull rod 18, pivotally connected at one end to the arm 4, extends to the front end of the vehicle and is operatively connected to a pedal lever 19, so that when the pedal 20 is depressed, the rod 18 will be pulled toward the left. At an intermediate point, the pull rod 18 is provided with an enlarged portion 21 having a vertical opening 22 for receiving the end of the lever 17 and having elongated transverse slots 23 in which plays a pin 24, secured to the end of the arm 17.

A coil spring 25 surrounds a portion of the pull rod 18 and engages at one end a cross member 26 of the vehicle and at the other end a sleeve 27, which is secured to said pull rod, said spring tending to move the pull rod 18 toward the right.

If it is desired to apply the brakes, the pedal 20 is depressed, causing a movement of the pull rod 18 toward the left. The arm 4 of the brake valve device 1 is therefore actuated to cause rotation of the shaft 3 and the cam 5, so that the cam operates the stem 6 to effect the supply of fluid under pressure to the rear brakes of the vehicle and thus cause the brakes to be applied.

During the initial movement of the pedal 20 and the pull rod 18, the slots 23 in the enlarged portion 21, permit movement of the rod without engaging the pin 24, but when the lost motion in the slots is taken up, further movement of the pedal and the pull rod 18, causes the pin 24 to be pulled toward the left and thereby the arm 17 is rocked, so that the shaft 11 is rotated and the arms 16 are also rotated to cause a movement to the right of the pull rods 10 at each side of the vehicle. The cam shafts 8 are then actuated to cause the brakes to be applied at the front wheels of the vehicle.

The further movement of the pull rod 18 to apply the brakes at the front wheels does not have any effect on the brake valve device, since this further movement merely causes the cam portion 5 to rotate further in engagement with the stem 6.

In order to release the brakes, the pedal 20 is relieved of pressure, so that the pull rod 18 is permitted to move toward the right. The initial movement of the pull rod 18 toward the right causes the arm 4 of the brake valve device to be shifted, so that the cam 5 moves out of engagement with the stem 6, permitting said stem to move to release position, in which fluid is released at the rear brakes so that the brakes at the rear are consequently released.

The movement of the pull rod 18 toward the right also permits movement of the arm 17, so that the shaft 11 rotates with the arm 16 to permit movement of the pull rod 10 to the left. The cam shaft 8 of each front wheel brake is thus rotated so as to effect the release of the brakes at the front wheels of the vehicle.

Having now described my invention, what I claim as new and desire to secure by Letters Patent, is:

1. In an automotive brake, the combination with a brake valve device for controlling the fluid pressure brakes at the rear wheels of the vehicle and mechanical means for operating the brakes at the front wheels of the vehicle, the rear wheel brakes being operated only by fluid pressure and the front wheel brakes only mechanically, of a pull rod, means operated by said pull rod for first operating said brake valve device and then said mechanical operating means, and a manually operated member for operating said pull rod.

2. In an automotive brake, the combination with a brake valve device for controlling the fluid pressure brakes at the rear wheels of the vehicle and mechanical means for operating the brakes at the front wheels of the vehicle, of a pull rod for operating said brake valve device and having a lost motion connection to said mechanically operated means and a manually operable member for operating said pull rod.

3. In an automotive brake, the combination with a brake valve device for controlling the supply of fluid under pressure for operating the rear wheel brakes and pull rods for mechanically operating the front wheel brakes, of a main pull rod for operating said brake valve device, a lever for actuating said front wheel brake operating pull rods, and having a lost motion connection to the main pull rod, and manually operable means for actuating said main pull rod.

4. In an automotive brake, the combination with a brake valve device for controlling the fluid under pressure for operating the rear wheel brakes and including a stem, and a cam for operating said stem, of a pull rod for operating said cam, a manually operated member for actuating said pull rod, and mechanical means operated after a movement of said pull rod relative to said mechanical means for mechanically operating the front wheel brakes.

In testimony whereof I have hereunto set my hand.

ANDREW C. MATHIESON.